H. M. LEONARD.
GEARING.
APPLICATION FILED OCT. 15, 1917.
1,269,944.
Patented June 18, 1918.
2 SHEETS—SHEET 1.
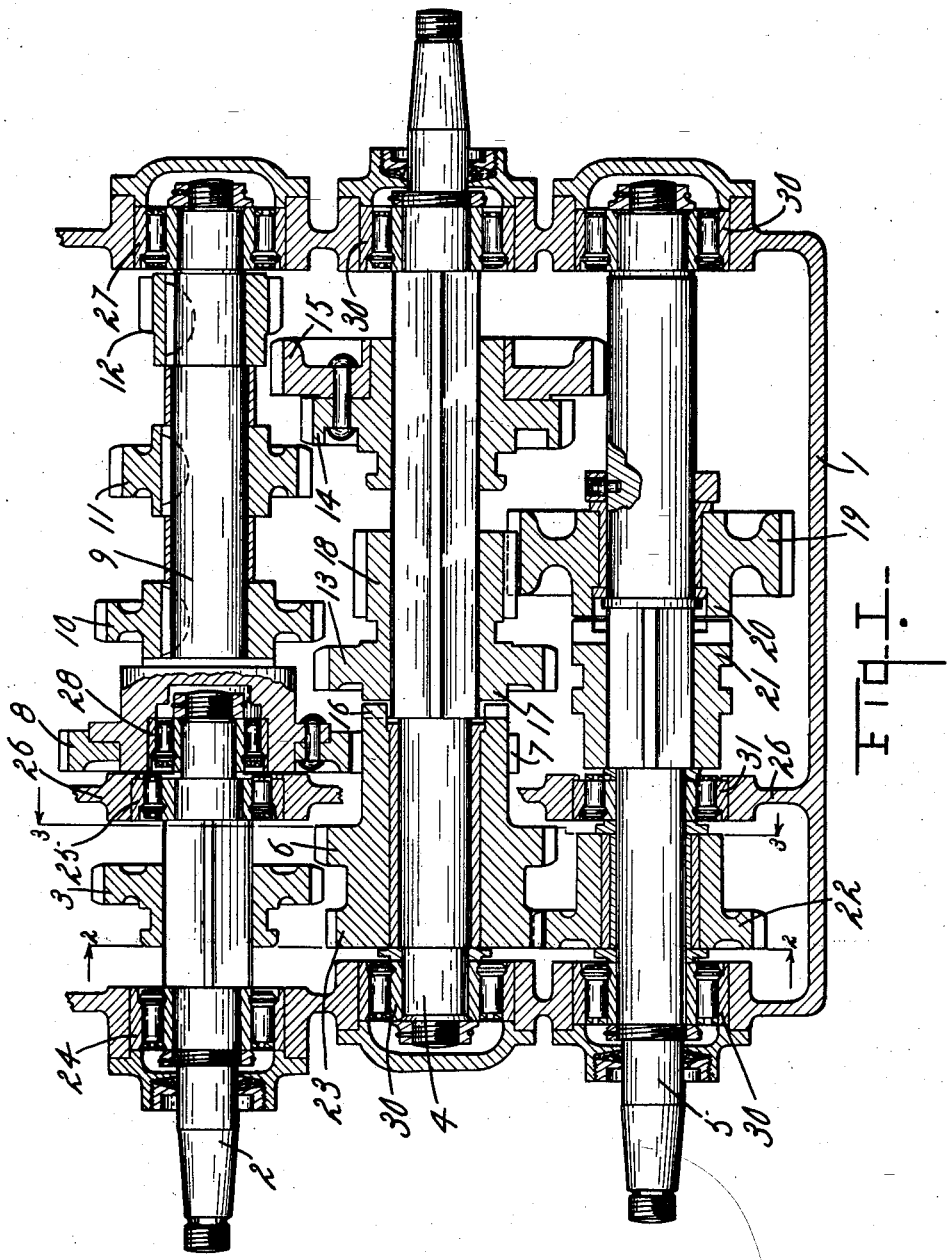
Inventor
HOWARD M. LEONARD
Witness
Luther Blake
M. Louise Thurston
By Chappell Earl
Attorney H. M. LEONARD.
GEARING.
APPLICATION FILED OCT. 15, 1917.
1,269,944.
Patented June 18, 1918.
2 SHEETS—SHEET 2.
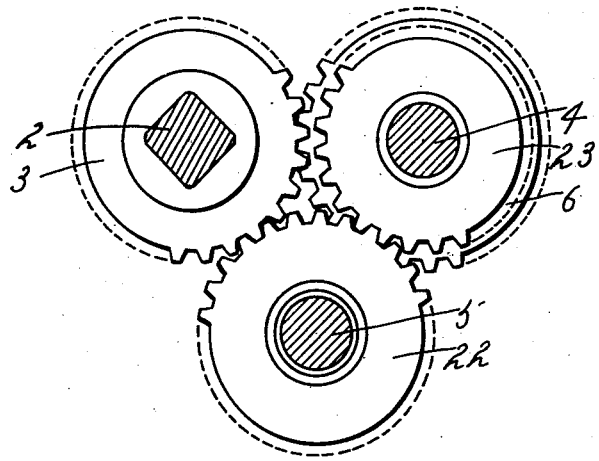
FIG. II.
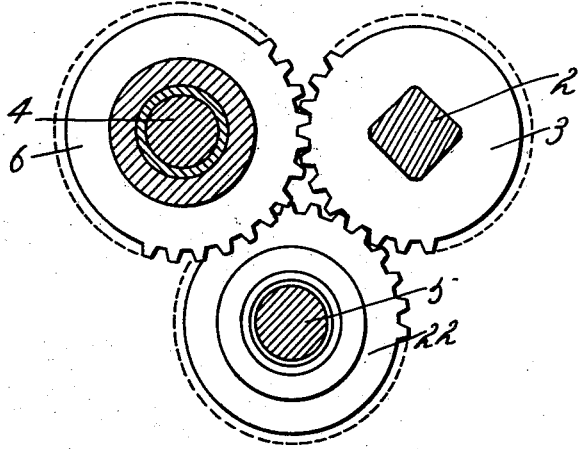
FIG. III.
Inventor
HOWARD M. LEONARD
Witnesses
Luther Blake
M. Louise Thurston
By Chappell Earl
Attorney

UNITED STATES PATENT OFFICE.

HOWARD M. LEONARD, OF JACKSON, MICHIGAN.

GEARING.

1,269,944. Specification of Letters Patent. Patented June 18, 1918.

Application filed October 15, 1917. Serial No. 196,643.

*To all whom it may concern:*

Be it known that I, HOWARD M. LEONARD, a citizen of the United States, residing at the city and county of Jackson and State of Michigan, have invented certain new and useful Improvements in Gearing, of which the following is a specification.

This invention relates to improvements in gearing.

My improved gearing is especially designed by me for use in four wheel drive tractors although adaptable and desirable for use in other relations.

The main objects of this invention are:

First, to provide an improved transmission gearing having a plurality of forward and reverse speeds.

Second, to provide an improved transmission gearing having a pair of driven shafts.

Third, to provide an improved transmission gearing which is well adapted for heavy work and at the same time is comparatively simple and compact in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail view of my improved transmission distorted to bring the shafts into the same plane, parts being shown in section.

Fig. II is a detail transverse section on a line corresponding to line 2—2 of Fig. I, showing the shafts and gears in their proper relation.

Fig. III is a detail transverse section on a line corresponding to line 3—3 of Fig. I, with the shafts and gears in their proper relation.

In the drawing, similar reference characters refer to similar parts throughout the several views, and the sectional views are taken looking in the direction of the little arrows at the ends of the section lines.

Referring to the drawing, I provide a casing or gear box 1 provided with suitable bearings for the shafts. In Fig. I the shafts are, as stated, shown in a distorted relation to bring the shafts into the same plane, the object being to facilitate illustration and understanding of the structure. The parts are shown in their correct relation in Figs. II and III.

The driving or power shaft 2 has a driving gear 3 splined thereon. I provide a pair of driven shafts 4 and 5 which project from the gear box at opposite ends thereof to receive the front and rear propeller shafts, the structure being designed for use on a tractor of the type shown in my application for Letters Patent filed February 2, 1917, Serial No. 146,118. A driven gear 6 is rotatably mounted upon the driven shaft 4 and has connected thereto a gear 7 meshing with a gear 8 fixed to the intermediate shaft 9. The intermediate shaft 9 is in alinement with the driving shaft 2. Variable speed gears 10, 11 and 12 are keyed to this intermediate shaft. The driven shaft 4 has variable speed gears 13, 14 and 15 splined thereto to coact with the gears 10, 11 and 12 respectively, thus securing three variations in speed for the driven shaft 4. The driven gear 6 has a clutch jaw 16 thereon while the gear 13 is provided with coacting clutch jaws 17 so that a direct connection or drive may be had with the driven shaft 4, thus providing for four speeds. The gear 18 is mounted on the driven shaft 4 to rotate therewith and disposed to mesh with a gear 19 rotatably mounted on the shaft 5. These gears are proportioned so as to compensate for the difference in dimension of the front and rear traction wheels. If the front and rear traction wheels were of the same dimension the gears would be provided so that the shafts would travel at the same speed. The gear 19 is provided with clutch jaws 20 with which the clutch member 21 coacts to connect the gear 19 to the driven shaft 5.

I have not illustrated the shifting means for the variable speed gears and clutch as such shifting means are well known in the art and form no part of my present invention. To secure the reverse I mount a reverse gear 22 upon the reverse shaft 5 in mesh with a gear 23 connected to the driven gear 6. The gear 22 is disposed so that the driving gear 3 may be shifted into mesh to secure the reverse drive or in mesh with the driven gear to secure the forward drive.

It will be seen that four speeds are provided both forward and reverse. This is of particular advantage in tractors of this type.

The driving shaft 2 is supported by bearing 24 at its outer end and the bearing 25 at its inner end supported by the partition or bridge 26. The intermediate shaft 9 is supported at its outer end by bearing 27 and at its inner end by the bearing 28 supported by the driving shaft. The driven shaft 5 is supported at its ends by the bearings 30 and the intermediate bearing 31 supported by the bridge 26, and shaft 4 is supported by similar bearings 30. With the shafts thus supported they are well adapted to receive the strains to which they are subjected in use.

I have illustrated and described my invention in one form in which I have embodied the same in practice. I have not attempted to illustrate or describe various modifications and adaptations which I contemplate as I believe the disclosure made will enable those skilled in the art to which my invention relates to embody or adapt the same as may be desired.

Having thus described my invention, what I claim as new and desire to secure by Letters Patent is:

1. The combination of a driving shaft, a driven shaft, an intermediate shaft disposed in alinement with said driving shaft, a driving gear splined to said driving shaft, a driven gear rotatable on said driven shaft, a pair of gears connected to said driven gear, a gear on said intermediate shaft meshing with one of said gears connected to said driven gear, variable speed gears on said intermediate shaft, coacting variable speed gears splined to said driven shaft, coacting clutch members for said driven gear and one of said shifting gears, a second driven shaft, a reversing gear rotatably mounted on said second driven shaft and meshing with the other of said pair of gears connected to said driven gear, said driving gear being adapted to coact with said driven gear or said reversing gear, coacting gears on said driven shafts, the gear on the second driven shaft being rotatable thereon, and a clutch for connecting the said gear on said driven shaft thereto.

2. The combination of a driving shaft, a driven shaft, an intermediate shaft disposed in alinement with said driving shaft, a driving gear splined to said driving shaft, a driven gear rotatable on said driven shaft, a pair of gears connected to said driven gear, a gear on said intermediate shaft meshing with one of said gears connected to said driven gear, variable speed gears on said intermediate shaft, coacting variable speed gears splined to said driven shaft, coacting clutch members for said driven gear and one of said shifting gears, a reversing gear meshing with the other of said pair of gears connected to said driven gear, said driving gear being adapted to coact with said driven gear or said reversing gear, and driving connections for said driven shafts.

3. The combination of a driving shaft, a driven shaft, an intermediate shaft disposed in alinement with said driving shaft, a driving gear splined to said driving shaft, a driven gear rotatable on said driven shaft, a pair of gears connected to said driven gear, a gear on said intermediate shaft meshing with one of said gears connected to said driven gear, variable speed gears on said intermediate shaft, coacting variable speed gears splined to said driven shaft, coacting clutch members for said driven gear and one of said shifting gears, a second driven shaft, a reversing gear rotatably mounted on said second driven shaft and meshing with the other of said pair of gears connected to said driven gear, said driving gear being adapted to coact with said driven gear or said reversing gear, and driving connections for said driven shafts.

4. The combination of a driving shaft, a driven shaft, an intermediate shaft, a driving gear splined to said driving shaft, a driven gear rotatable on said driven shaft, a pair of gears connected to said driven gear, a gear on said intermediate shaft meshing with one of said gears connected to said driven gear, coacting variable speed gears on said intermediate and driven shaft, control means therefor, a clutch connection for said driven gear to said driven shaft, a second driven shaft, a reversing gear rotatably mounted on said second driven shaft and meshing with the other of said pair of gears connected to said driven gear, said driving gear being adapted to coact with said driven gear or said reversing gear, coacting gears on said driven shafts, the gear on the second driven shaft being rotatable thereon, and a clutch for connecting the said gear on said driven shaft thereto.

5. The combination of a driving shaft, a driven shaft, an intermediate shaft, a driving gear splined to said driving shaft, a driven gear rotatable on said driven shaft, a pair of gears connected to said driven gear, a gear on said intermediate shaft meshing with one of said gears connected to said driven gear, coacting variable speed gears on said intermediate and driven shaft, control means therefor, a clutch connection for said driven gear to said driven shaft, and a reversing gear meshing with the other of said pair of gears connected to said driven gear, said driving gear being adapted to coact with said driven gear or said reversing gear.

6. The combination of a driving shaft, a driven shaft, an intermediate shaft, a driving gear splined to said driving shaft, a driven gear rotatable on said driven shaft, a pair of gears connected to said driven gear, a gear on said intermediate shaft meshing with one of said gears connected to said driven gear, coacting variable speed gears on said intermediate and driven shaft, control means therefor, a clutch connection for said driven gear to said driven shaft, a second driven shaft, a reversing gear rotatably mounted on said second driven shaft and meshing with the other of said pair of gears connected to said driven gear, said driving gear being adapted to coact with said driven gear or said reversing gear, and driving connections for said driven shafts.

7. The combination of a driving shaft, a driven shaft, an intermediate shaft, a driving gear splined to said driving shaft, a driven gear rotatable on said driven shaft, a pair of gears connected to said driven gear, a gear on said intermediate shaft meshing with one of said gears connected to said driven gear, coacting variable speed gears on said intermediate and driven shaft, a reversing gear meshing with the other of said pair of gears connected to said driven gear, said driving gear being adapted to coact with said driven gear or said reversing gear, and driving connections for said driven shafts.

8. The combination of a driving shaft, a driven shaft, an intermediate shaft, a driving gear splined to said driving shaft, a driven gear rotatable on said driven shaft, a pair of gears connected to said driven gear, a gear on said intermediate shaft meshing with one of said gears connected to said driven gear, coacting variable speed gears on said intermediate and driven shaft, a second driven shaft, a reversing gear rotatably mounted on said second driven shaft, and meshing with the other of said pair of gears connected to said driven gear, said driving gear being adapted to coact with said driven gear or said reversing gear, and driving connections for said driven shafts.

9. The combination of a driving shaft, a driven shaft, an intermediate shaft, a driving gear splined to said driving shaft, a driven gear rotatable on said driven shaft, driving connections therefor to said intermediate shaft, coacting variable speed gears on said intermediate and driven shafts, a second driven shaft, a reversing gear rotatably mounted on said second driven shaft, a gear coacting therewith connected to said driven gear, said driving gear being adapted to coact with said driven gear or said reversing gear, and disconnectible driving connections for said driven shafts.

10. The combination of a driving shaft, a driven shaft, an intermediate shaft, a driving gear splined to said driving shaft, a driven gear rotatable on said driven shaft, driving connections therefor to said intermediate shaft, coacting variable speed gears on said intermediate and driven shafts, a reversing gear, and a gear coacting therewith connected to said driven gear, said driving gear being adapted to coact with said driven gear or said reversing gear.

In witness whereof, I have hereunto set my hand and seal in the presence of two witnesses.

HOWARD M. LEONARD. [L. S.]

Witnesses:
   HOWARD G. LEONARD,
   BERYL COCHRANE.